Sept. 9, 1941.    O. GREEN    2,255,052
PASTRY PADDLE
Filed July 6, 1940
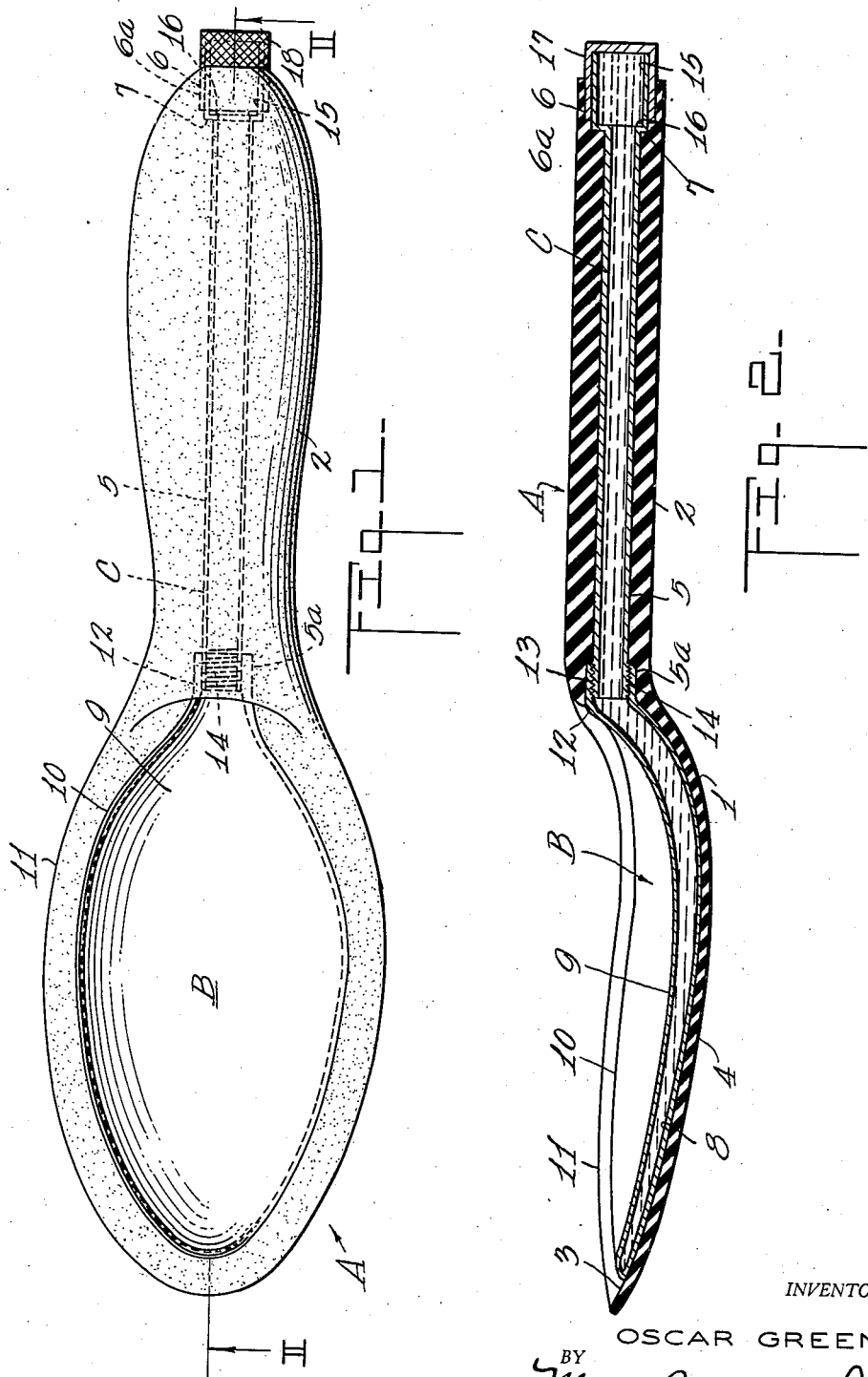
INVENTOR.
OSCAR GREEN.
BY
Munn, Anderson & Liddy.
ATTORNEYS.

Patented Sept. 9, 1941

2,255,052

UNITED STATES PATENT OFFICE 2,255,052

PASTRY PADDLE

Oscar Green, San Mateo, Calif.

Application July 6, 1940, Serial No. 344,293

4 Claims. (Cl. 30—140)

The present invention relates to improvements in a pastry paddle, and it consists of the combinations, constructions and arrangements hereinafter described and claimed.

An object of my invention is to provide a pastry paddle that has novel means for providing the inner surface of the paddle bowl with a heated surface. I have found that the mixing of cake, and other pastries, or the creaming of butter and sugar, can be expedited by heating the paddle bowl.

The pastry paddle is preferably made of a heat non-conducting material, such as wood or plastic. Different kinds of insulating material used for the non-conducting of heat may be shaped into a paddle, beater or spoon of convenient shape.

The means for providing a heated surface on the interior or concave surface of the paddle bowl comprises a two-piece metal container for holding a fluid. One part of the container is shaped to correspond to the paddle bowl so as to fit snugly thereinto. The periphery of the paddle bowl extends beyond the rim of the part of the container therein in order to protect it. The other part is a filling tube that extends through the hollow paddle handle and communicates with the metal bowl-shaped part. Hot water is retained in the metal bowl and will keep the concave portion of the paddle bowl at a higher temperature than the ingredients being mixed.

A further object of my invention is to provide a device of the type described, which is simple in construction, durable and efficient for the purpose intended. The two-part fluid container may be readily removed from the paddle for cleaning purposes.

Other objects and advantages will appear as the specification proceeds, and the novel features of my invention will be set forth in the claims hereunto appended.

My invention is illustrated in the accompanying drawing, forming part of this application, in which:

Figure 1 is a plan view of the device; and

Figure 2 a section taken along the line II—II of Figure 1.

While I have shown only the preferred form of my invention it should be understood that various changes or modifications may be made within the scope of the claims hereunto annexed without departing from the spirit of the invention.

In carrying out my invention I provide a pastry paddle indicated generally at A. The paddle has a bowl-shaped portion 1 and an integral hollow handle 2. The bowl 1 may take any shape that may be desired. I have shown a concave surface 3 and a convex surface 4. The bore 5 of the handle communicates with the concave portion 3 of the bowl. It will be seen that the outer end of the bore 5 is enlarged as at 6 to form a shoulder 7 for the purpose hereinafter described. The paddle A may be constructed from any desired heat insulating material, such as wood or plastic.

The two-part fluid metal container comprises a bowl-shaped part B and a tubular metal part C. The part B has a rear surface 8 and conforms to the surface 3 of the paddle. The front wall 9 is spaced from the rear wall and is concave so as to have a bowl-shaped surface that will contact with the material to be mixed or stirred. The two walls 8 and 9 are integral with each other at their peripheries and the rim 10 thus provided is spaced inwardly from and is parallel with the edge 11 of the paddle. The drawing illustrates a space of about one-quarter of an inch between the rim 10 and edge 11, although I do not wish to be confined to this dimension.

The bowl-shaped metal part B has an integral neck 12 that projects a slight distance into the inner end of the bore 5. The bore is slightly enlarged at 5a for snugly receiving the neck 12. The latter, when anchored in the portion 5a, holds the metal paddle B in intimate contact with the concave surface 3 of the pastry bowl paddle 1. No other means of fastening need be resorted to for holding the metal paddle B in place. The metal paddle is shallow in thickness so as to offer no obstruction to the normal use of the pastry paddle. The wall 9 in effect constitutes a heated surface for the concave surface 3.

The metal tube C not only acts as a means for securing the metal bowl B against accidental removal from the pastry paddle bowl, but it also constitutes an inlet tube for receiving hot water or other fluid and delivering it to the metal paddle B. The neck 12 is internally threaded at 13 and the tube C has its adjacent end externally threaded at 14 so that the tube may be screwed to the metal bowl B and thus connected to it. The neck 12 in effect is a screw threaded socket for receiving the tube C. The latter fills the bore 5 as clearly illustrated in Figure 2.

The other end of the tube 5 is enlarged as at 15 and has a shoulder 16 designed to bear against the bore shoulder 7. The enlarged portion 15 extends beyond the end of the handle 2 so that it may be rotated with respect to the handle for screwing the tube into the neck socket 12 or removing it therefrom.

A slip-on cap 17 is removably secured to the enlarged tube portion 15 and the bore 6 is further enlarged at 6a for receiving the cap. A knurled cap head 18 makes it easy for the cap to be removed from the tube or secured thereto.

From the foregoing description of the various parts of the pastry paddle, the operation thereof may be readily understood. I have already described the manner in which the metal bowl B may be quickly secured to the tube C or removed therefrom and also the way in which the metal bowl is fastened to the paddle A. The metal bowl B is first placed in position and then the tube is secured in the socket 12 for holding the two metal parts together. The shoulder 16 bears against the handle shoulder 7 for preventing inward movement of the tube C after the two shoulders abut each other. The part B is pulled toward the handle when the tube is screwed in place and this firmly anchors the two parts together.

The wooden paddle 1 protects the metal part B and prevents the latter from scratching the mixing bowl in which the device is being used. The effective inner surface 3 or concavity of the paddle is heated by the part B. The handle 2 remains cool because it resists heat and the tube is entirely surrounded by the handle. The tube C performs another function of acting as a fluid reservoir for the part B. The hot water in the part B will not cool off as rapidly if the hot water in the tube has access thereto on the simple theory that the larger the quantity of hot water, the greater amount of heat it will expend before being cooled. The cap forms a liquid-tight seal for the two-part container.

In the making of butter cakes, it is necessary to mix the butter and sugar together. The usual way of doing this is to cream the shortening by mashing and beating it with a spoon until it has the texture of very thick cream. Then the sugar is gradually added, about two tablespoons at a time, creaming after each addition until the mixture is perfectly blended and very light. This takes considerable time and is very monotonous.

With my pastry paddle heated to a desired degree by the hot water in the container B, I am able to greatly reduce the time necessary to cream the butter and sugar together and to place the entire amount of sugar and butter necessary in the bowl at the start of the operation. This permits the full amount of butter and sugar to be mixed together in one operation and to cream instantly. The heat from the paddle will soften the butter sufficiently to readily cream with the sugar without melting the butter. This is one of the principal advantages of the device.

I claim:

1. The combination with a pastry paddle having a bowl-shaped portion and an integral hollow handle, of a bowl-shaped metal fluid container fitting in the first-named bowl-shaped portion, and a tube received in the hollow handle and being removably secured to the metal fluid container.

2. A pastry paddle having a bowl-shaped portion, and a heating member lining the concave portion of the bowl and cooperating therewith to provide a heated bowl for the paddle.

3. A pastry paddle having a bowl and a handle, a hot water container placed in the bowl and conforming therewith, and a water inlet tube extending through the handle and communicating with the container.

4. In combination, a one-piece pastry paddle having a bowl and a hollow handle, the bore in the handle being enlarged and provided with a shoulder, a bowl-shaped metal fluid container conforming with and placed in the bowl and having a socket-like neck received in the bore, a tube in the bore and screwed into the socket, said tube having an enlarged portion with a shoulder bearing against the bore shoulder, and a cap closing the enlarged end of the tube.

OSCAR GREEN.